United States Patent Office 3,088,959
Patented May 7, 1963

3,088,959
PROCESS OF MAKING CYCLOPENTADIENYL NICKEL NITROSYL COMPOUNDS
Robert D. Feltham, Joseph F. Anzenberger, and Jonathan T. Carriel, Pittsburgh, Pa., assignors to The International Nickel Company, Inc., New York, N.Y., a corporation of Delaware
No Drawing. Filed Sept. 1, 1960, Ser. No. 53,374
6 Claims. (Cl. 260—439)

The present invention relates to the production of nickel compounds and, more particularly, to the production of nickel nitrosyl compounds containing a group having the cyclopentadienyl moiety.

Compounds such as cyclopentadienylnickel nitrosyl, methylcyclopentadienylnickel nitrosyl and other complex nitrosyl compounds containing a cyclopentadienyl-type group have been made. Such compounds have use as gasoline additives. When such use is contemplated, it is economically imperative that the compounds be produced in good yield from the most readily available and inexpensive raw materials. A further desideratum is that the process result in a product which can be readily separated into usable fractions. Although attempts were made to provide an industrially acceptable process, none, as far as we are aware, was entirely successful when carried into practice commercially on an industrial scale.

It has now been discovered that by means of a special process, nickel nitrosyl compounds containing a cyclopentadienyl-type group can be made in good yield from comparatively inexpensive raw materials.

It is an object of the present invention to provide a novel process for the production of nickel nitrosyl compounds having a cyclopentadienyl-type group.

Another object of the invention is to provide a novel single stage process for the production of nickel nitrosyl compounds having a cyclopentadienyl-type group.

The invention also contemplates providing a novel process for the production of cyclopentadienylnickel nitrosyl.

Other objects and advantages will become apparent from the following description.

Generally speaking, the present invention is directed to a process for the production of nitrosyl compounds of nickel which comprises subjecting a mixture of nickel carbonyl, a base and a reaction medium to the action of nitric oxide. Nickel nitrosyl compounds having the nickel covalently bonded to a group such as cyclopentadienyl and groups homologous thereto, e.g., methylcyclopentadienyl, are produced in accordance with the present invention by forming a mixture of nickel carbonyl, a base and a reaction medium and thereafter adding cyclopentadiene or a compound homologous thereto and nitric oxide to the mixture. The cyclopentadiene (or cyclopentadiene-type compound) can be added either before, simultaneous with, or after the nitric oxide. Advantageously, when the nitric oxide is added, it is at a partial pressure of at least about atmospheric pressure and more advantageously at a partial pressure substantially above atmospheric pressure.

The terms "cyclopentadienyl-type" and "cyclopentadiene-type" are used to denote groups and compounds, respectively, which contain the cyclopentadienyl group and groups homologous thereto. Cyclopentadiene-type compounds include all compounds which have the moiety or grouping of carbon atoms which is present in cyclopentadiene. This grouping is illustrated as

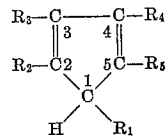

The substituent groups on the cyclopentadiene moiety indicated as $R_1$, $R_2$, $R_3$, $R_4$ and $R_5$ are any one or more of hydrogen atoms, halogen atoms and/or organic groups such as aliphatic groups, aromatic groups, alicyclic groups, etc. The substituent groups can also bond at two positions. Where this occurs, groups can substitute for adjacent R groups, e.g., $R_2$ and $R_3$ and/or $R_4$ and $R_5$ to form indene and other condensed ring structures.

As mentioned hereinbefore, when carrying out the process of the present invention, the reactants are reacted in the presence of a base. The base can advantageously be a nitrogen base or a phosphorus base or an alkoxide of a metal having a strong hydroxide. Nitrogen bases include ammonia, primary, secondary and tertiary amines, quaternary ammonium hydroxides and the heterocyclic nitrogen bases. Satisfactory nitrogen bases include ammonia, diethylamine, triethylamine, pyridine, di-n-butylamine, diethanolamine, morpholine, tri-n-butyl-amine, triethylenediamine, n-butylamine, piperidine and ethylenediamine. Phosphorus bases include the alkyl substituted phosphines. Examples of such phosphorus bases include triethyl phosphine and tri-n-butylphosphine. Examples of satisfactory alkoxides include sodium ethoxide, potassium isopropoxide and cesium butoxide.

Because the reaction between the nickel carbonyl and nitric oxide is highly exothermic in nature, it is desirable that the reaction be carried out in a liquid medium. The medium should be a solvent for the reactants and intermediates. It should have a high heat capacity and be readily separable from the product and unused reactants. Advantageously, the medium should also be substantially inert with respect to the reactants, intermediates and/or the products. In practice, however, these ideal characteristics are almost impossible to attain in a single medium. From the practical viewpoint, however, the reaction medium can be commercially available alcohol, for example, ethanol and methanol, an ether such as ethyleneglycoldimethyl-ether, a high boiling point ester such as di-2-ethylhexyl adipate, or may be triethylamine.

When carrying out the process of the present invention, care must be taken to exclude oxygen-containing gas from the reaction medium when nitric oxide is present. Nitric oxide reacts with oxygen in air or other gas to form nitrogen dioxide. Nitrogen dioxide reacts with and destroys the cyclopentadiene-type nickel nitrosyl compound. Thus, the presence of nitrogen dioxide in the reaction mixture serves to decrease the yield of the desired product.

After nitric oxide has been introduced into the reaction medium which advantageously contains the cyclopentadiene-type compound, the amine and nickel carbonyl, an initial reaction takes place wherein the reactants react to form a nickel nitrosyl intermediate compound. This intermediate thereafter reacts to form the desired compound. Advantageously, by proper selection of the copresent base, this reaction takes place almost immediately. In certain instances, however, after all desirable reaction with nitric oxide is completed, considerable time must elapse before the desired product is obtained. This time of course depends, in at least part, upon the temperature at which the intermediate is maintained. On the other hand, the rate of the initial reaction, all other things being equal, is primarily dependent upon the partial pressure of nitric oxide. In practice, the partial pressure of nitric oxide should be high, preferably in excess of about 15 pounds per square inch (p.s.i.) (gage). The nitric oxide should be present with respect to nickel carbonyl in a ratio in excess of about 2 to 1 in moles and advantageously not greater than about 4 to 1 in moles. In ordinary practice, the cyclopentadiene-type compound should also be present in an amount in excess of one mole for mole with respect to nickel carbonyl. Thus, it is advisable to maintain the cyclopentadiene-type compound present in a mole ratio of about 1.1 to 1 to 2 to 1 with respect to the nickel carbonyl.

When carrying out the process of the present invention, advantageous results have been achieved when the reaction medium at the start of the reaction has been at room temperature. The reactions are exothermic and, accordingly, the temperature rises while carrying out the process. Care should be taken that the temperature not be allowed to go so high that thermal decomposition of the desired product occurs.

In carrying the invention into practice, advantageous results have been attained when cyclopentadiene is reacted batchwise in a pressure autoclave with nickel carbonyl and nitric oxide in the presence of diethylamine and absolute ethanol. The useful product in this instance is cyclopentadienylnickel nitrosyl. Yields of cyclopentadienylnickel nitrosyl of the order of greater than about 85% based upon the amount of nickel carbonyl present have been achieved. Cyclopentadienylnickel nitrosyl is readily separated from the alcohol, the amine and reaction products by distillation.

For the purpose of giving those skilled in the art a better understanding of the invention, the following illustrative examples are given:

*Example I*

Cyclopentadienylnickel nitrosyl is prepared by reacting 17 parts by weight of nickel carbonyl and 15.8 parts by weight of cyclopentadiene with about 23.2 parts by weight of nitric oxide in a pressure reactor. The reactants (with the exception of nitric oxide) are dissolved in 158 parts by weight of absolute ethanol which also contains 14.6 parts by weight of diethylamine. The initial pressure of the nitric oxide is 300 p.s.i. gage. One and one-half minutes after the nitric oxide is admitted to the reactor, a red brown cloudy liquid is obtained which contains about 13.8 parts by weight of cyclopentadienylnickel nitrosyl. The reaction produces a 90% yield of product based upon the nickel carbonyl present.

*Example II*

Cyclopentadienylnickel nitrosyl is produced by reacting 17 parts by weight of nickel carbonyl and 13.2 parts by weight of cyclopentadiene with about 15.4 parts by weight of nitric oxide in a pressure reactor. The nickel carbonyl and cyclopentadiene are dissolved in 158 parts by weight of absolute ethanol which also contains 8 parts by weight of diethylamine. The mixture is initially at room temperature. Two and one-half minutes after the introduction of the nitric oxide at a pressure of 200 p.s.i. gage, a red brown cloudy liquid containing about 12 parts by weight of cyclopentadienylnickel nitrosyl is obtained. The product represents a yield of about 78% with respect to the initial amount of nickel carbonyl.

*Example III*

Methylcyclopentadienylnickel nitrosyl is produced by reacting 17 parts by weight of nickel carbonyl and 16 parts by weight of methylcyclopentadiene with about 23.2 parts by weight of nitric oxide in a pressure reactor. The nickel carbonyl and methylcyclopentadiene are dissolved in 158 parts by weight of absolute ethanol which also contains 14.6 parts by weight of diethylamine. The mixture is maintained initially at room temperature. Two minutes after nitric oxide is introduced into the reactor at 300 p.s.i. gage, an initial reaction is complete with the production of a green cloudy solution containing an intermediate. After a few hours, the solution turns red brown and contains 7.06 parts by weight of the desired product. The reaction produces a 42% yield based upon nickel carbonyl initially present.

*Example IV*

Cyclopentadienylnickel nitrosyl is produced by reacting 17 parts by weight of nickel carbonyl and 13 parts by weight of cyclopentadiene with about 15.3 parts by weight of nitric oxide in a pressure reactor. The nickel carbonyl and cyclopentadiene are dissolved in 158 parts by weight of absolute ethanol which also contains 20 parts by weight of triethylamine. The mixture is initially at room temperature. One and one-half minutes after nitric oxide is introduced at 200 p.s.i. gage, a green, clear liquid is obtained. This liquid turns red on standing and contains a substantial amount of cyclopentadienylnickel nitrosyl.

*Example V*

Cyclopentadienylnickel nitrosyl is produced by dissolving 4.5 parts by weight of diethylamine and 6.6 parts by weight of nickel carbonyl in 158 parts by weight of absolute ethanol. The mixture is placed in a suitable vessel and is purged with nitrogen. Nitric oxide at substantially atmospheric pressure is then bubbled through the mixture for 150 minutes while the mixture is held at room temperature. The temperature is then raised to 40° C. and the passage of nitric oxide is continued for 30 minutes. The vessel is then purged with nitrogen and the mixture now containing a blue nickel nitrosyl compound is dried with anhydrous calcium sulfate. 20 parts by weight of cyclopentadiene are then added. After standing a yield of about 24% based upon reacted nickel carbonyl (about 62% of the nickel carbonyl added) is obtained.

*Example VI*

Cyclopentadienylnickel nitrosyl is prepared by reacting 17 parts by weight of nickel carbonyl and 12 parts by weight of cyclopentadiene with about 15.4 parts by weight of nitric oxide in a pressure reactor. The liquid reactants are dissolved in 158 parts by weight of ethanol which also contains about 26 parts by weight of tri-n-butyl phosphine. The initial pressure of the nitric oxide is 200 p.s.i. gage. After four minutes, a liquid product is obtained which, after a short time, contains a yield of the desired cyclopentadienylnickel nitrosyl.

*Example VII*

Cyclopentadienylnickel nitrosyl is prepared by reacting 17 parts by weight of nickel carbonyl and 13 parts by weight of cyclopentadiene with about 15.4 parts by weight of nitric oxide in a pressure reactor. The liquid reactants are dissolved in 158 parts by weight of absolute ethanol which also contains about 7.5 parts by weight of sodium ethoxide. The mixture is initially at room temperature. The initial pressure of nitric oxide is 200 p.s.i. gage, which pressure dropped almost immediately to 125 p.s.i. gage. After four minutes, a yield of about 23% of cyclopentadienylnickel nitrosyl is obtained on the basis of reacted nickel carbonyl.

*Example VIII*

Cyclopentadienylnickel nitrosyl is prepared by reacting 17 parts by weight of nickel carbonyl and 13 parts by weight of cyclopentadiene with about 15.4 parts by weight of nitric oxide in a pressure reactor. The liquid reactants are dissolved in 158 parts by weight of absolute ethanol which contains about 17 parts by weight of piperidine. The mixture is initially at room temperature. The initial pressure of nitric oxide is 200 p.s.i. gage. After three minutes, a substantial yield of cyclopentadienylnickel nitrosyl is obtained.

*Example IX*

Cyclopentadienylnickel nitrosyl is prepared by reacting 17 parts by weight of nickel carbonyl and 13 parts by weight of cyclopentadiene with about 15.4 parts by weight of nitric oxide in a pressure reactor. The liquid reactants are dissolved in about 158 parts by weight of absolute ethanol which contains about 17.4 parts by weight of morpholine. The mixture is initially at room temperature. The initial pressure of nitric oxide is 200 p.s.i. gage. After four minutes, the reaction mixture is dark blue to dark green in color. Upon standing, the reaction mixture is dark red and contains a substantial yield of cyclopentadienylnickel nitrosyl.

*Example X*

Cyclopentadienylnickel nitrosyl is prepared by reacting 17 parts by weight of nickel carbonyl and 13 parts by weight of cyclopentadiene with about 15.4 parts by weight of nitric oxide in a pressure reactor. The liquid reactants are dissolved in 158 parts by weight of isooctanol which contains about 14.6 parts by weight of diethylamine. The mixture is initially at room temperature. The initial pressure of nitric oxide is 200 p.s.i. gage. After about five minutes, the reaction mixture is red-brown in color and contains a substantial yield of cyclopentadienylnickel nitrosyl.

*Example XI*

Cyclopentadienylnickel nitrosyl is prepared by reacting 17 parts by weight of nickel carbonyl and 13 parts by weight of cyclopentadiene with about 15.4 parts by weight of nitric oxide in a pressure reactor. The liquid reactants are dissolved in 158 parts by weight of di-2-(ethylhexyl) adipate which contains about 14.6 parts by weight of diethylamine. The mixture is initially at room temperature. The initial pressure of nitric oxide is 200 p.s.i. gage. After about four minutes, a yield of about 30% of cyclopentadienylnickel nitrosyl is obtained on the basis of reacted nickel carbonyl.

*Example XII*

Cyclopentadienylnickel nitrosyl is prepared in the same manner as given in Example XI with the exception that ethyleneglycoldimethyl ether is employed as the liquid reaction medium in the place of di-2-(ethylhexyl) adipate. A substantial yield of cyclopentadienylnickel nitrosyl is obtained.

*Example XIII*

Cyclopentadienylnickel nitrosyl is produced by charging 11.5 parts by weight of nickel carbonyl, 6.8 parts by weight of cyclopentadiene and 81.7 parts by weight of triethylamine to a pressure reactor, agitating the resulting mixture and admitting nitric oxide at an initial pressure of 155 p.s.i. gage to the reactor. After about 20 minutes, 5.6 parts by weight of nitric oxide are consumed and the reaction mixture is a turbid blue-green solution. The solution is refluxed under nitrogen for 45 minutes and is then a deep red. A yield of cyclopentadienylnickel nitrosyl of 56% based upon reacted nickel carbonyl is obtained.

The present application is a continuation-in-part of our copending U.S. patent application, Serial No. 806,426, filed April 15, 1959, and now abandoned.

Although the present invention has been described in conjunction with preferred embodiments, it is to be understood that modifications and variations may be restored to without departing from the spirit and scope of the invention, as those skilled in the art will readily understand. Such modifications and variations are considered to be within the purview and scope of the invention and appended claims.

We claim:

1. A process for the production of cyclopentadienylnickel nitrosyl which comprises mixing nickel carbonyl, a base selected from the group consisting of nitrogen bases, phosphorus bases and alkoxides of metals having strong hydroxides and a liquid reaction medium and adding cyclopentadiene and nitric oxide to said mixture.

2. A process for the production of cyclopentadienylnickel nitrosyl which comprises mixing nickel carbonyl, absolute ethanol and diethylamine and adding nitric oxide and cyclopentadiene to said mixture, while the initial temperature of said mixture is about room temperature.

3. A process as set forth and defined in claim 2, wherein the nitric oxide is at a pressure of at least about 15 pounds per square inch gage.

4. A process for the production of nickel nitrosyl derivatives of substances selected from the group consisting of cyclopentadiene and methylcyclopentadiene which comprises subjecting nickel carbonyl to the action of nitric oxide at a partial pressure of at least one atmosphere in the presence of absolute ethanol and a base selected from the group consisting of diethylamine and triethylamine at an initial temperature of about room temperature and further reacting the reaction products thereof with a substance selected from the group consisting of cyclopentadiene and methylcyclopentadiene.

5. A process for the production of cyclopentadienylnickel nitrosyl comprising subjecting nickel carbonyl to the action of nitric oxide at a partial pressure of about 300 pounds per square inch gage in the presence of diethylamine, cyclopentadiene and a large excess of absolute ethanol at an initial temperature of about room temperature.

6. A process for the production of nickel nitrosyl derivatives of substances selected from the group consisting of cyclopentadiene and methylcyclopentadiene which comprises subjecting nickel carbonyl to the action of nitric oxide at a partial pressure of at least one atmosphere in the presence of liquid reaction medium and a base selected from the group consisting of nitrogenous bases, phosphorus bases and alkoxides of metals having strong hydroxides at an initial temperature of about room temperature and further reacting the reaction products thereof with a substance selected from the group consisting of cyclopentadiene and methylcyclopentadiene.

References Cited in the file of this patent

Wilkinson: J.A.C.S., vol. 76, pages 209 and 210 (1954).
Birmingham: J.A.C.S., vol. 76, page 4179 (1954).
Piper et al.: J. Inorganic & Nuclear Chemistry, vol. 1, pages 165–174 (1955).